United States Patent
Hosomi

(10) Patent No.: US 7,043,561 B2
(45) Date of Patent: May 9, 2006

(54) SYSTEM AND METHOD FOR PRIORITIZING REQUESTS FOR SERVER SERVICES

(75) Inventor: Takeo Hosomi, Tokyo (JP)

(73) Assignee: NEC Corporation, Tokyo (JP)

( * ) Notice: Subject to any disclaimer, the term of this patent is extended or adjusted under 35 U.S.C. 154(b) by 675 days.

(21) Appl. No.: 10/131,466

(22) Filed: Apr. 25, 2002

(65) Prior Publication Data
US 2002/0161836 A1 Oct. 31, 2002

(30) Foreign Application Priority Data
Apr. 25, 2001 (JP) .............................. 2001-126849

(51) Int. Cl.
*G06F 15/16* (2006.01)
(52) U.S. Cl. .................. 709/235; 709/208; 709/225; 709/233
(58) Field of Classification Search .............. 709/208, 709/235
See application file for complete search history.

(56) References Cited

U.S. PATENT DOCUMENTS

| | | | |
|---|---|---|---|
| 5,522,046 A * | 5/1996 | McMillen et al. ............ | 709/239 |
| 5,946,498 A * | 8/1999 | Chiang et al. ................ | 710/54 |
| 6,006,269 A * | 12/1999 | Phaal ............................ | 709/227 |
| 6,219,712 B1 * | 4/2001 | Mann et al. .................. | 709/235 |
| 6,604,136 B1 * | 8/2003 | Chang et al. ................ | 709/223 |
| 2002/0042836 A1 * | 4/2002 | Mallory ....................... | 709/232 |

FOREIGN PATENT DOCUMENTS

| | | |
|---|---|---|
| JP | A 62-174838 | 7/1987 |
| JP | A 5-225145 | 9/1993 |
| JP | A 5-314026 | 11/1993 |
| JP | A 11-219343 | 8/1999 |

OTHER PUBLICATIONS

H. Hosomi, "Dispersed personal memory of the parallel computer Cenju-4", Symposium on Parallel Processing, JSPP '99, vol. 99, No. 6, pp. 15-22.

* cited by examiner

*Primary Examiner*—Rupal Dharia
*Assistant Examiner*—Nicholas R Taylor
(74) *Attorney, Agent, or Firm*—Young & Thompson

(57) ABSTRACT

A system for providing services, including: a plurality of slave device for issuing respective request message; and at least a master device processing the request message in response to the respective request message to provide a response message to one of the plurality of slave device which issued the request message. The master device recognizes a priority-related information of the request message for processing the request message. The priority-related information includes: a first information indicating whether the request message is first received or has been received in the past but rejected for processing; and a second information indicating a receipt sequence of the request message.

4 Claims, 10 Drawing Sheets request message format response message format

FIG. 5

| busy | retry | current service no. = retry ID | current service no. = reserv.no. | operations |
|---|---|---|---|---|
| yes | yes | don't care | don't care | send to response transmitting unit |
|  | no | don't care | don't care | send to response transmitting unit renumber retry ID increment reservation number by 1 |
| no | yes | yes | don't care | send to response transmitting unit increment current service number |
|  |  | no | don't care | send to response transmitting unit |
|  | no | don't care | yes | send to response transmitting unit |
|  |  | don't care | no | send to response transmitting unit renumber retry ID increment reservation number by 1 |

SYSTEM AND METHOD FOR PRIORITIZING REQUESTS FOR SERVER SERVICES

BACKGROUND OF THE INVENTION

1. Field of the Invention

The present invention relates to a system and a method for providing services to clients, and more particularly to a system and a method for allowing a server (or a service-providing device) to provide services to clients (or service-requesting devices) coupled to the server through a network in accordance with requests from the clients, without causing starvation or deadlock.

2. Description of the Related Art

A multi-processor system includes one or more servers and a plurality of clients, which are coupled to each other through a network. Japanese laid-open patent publication No. 11-219343 discloses utilization of a conventional technique for processing plural requests with coherency of data issued from the clients without causing starvation or deadlock.

The server will hereinafter be appreciated as a master device, whilst the clients will hereinafter be appreciated as slave devices. The term "issued request number" will herein be defined to be the number of requests from the client that still remain outstanding.

The server included in the multi-processor system disclosed in the above Japanese publication further includes a first-in first-out (FIFO) buffer which receives and holds all of the requests issued from all of the clients, so that if the server just received one or more additional requests in addition to the presence of a currently-processed request which was past received, then the server saves the one or more additional requests to the buffer, regardless of whether or not further one or more past-received requests have also been saved in the buffer.

The server provides respective priority to the saved request in the buffer, so that after the current processing to the currently-processed request has been completed, then the server will process the saved request in the sequence of the given priority. If the buffer has already held one or more saved requests, then the server may optionally give a lower priority to the just-received request than those of all of the above one or more saved requests already held by the buffer. If the buffer has no saved request, then the server will, of course, promptly process the just-received request without saving the same into the buffer.

The buffer, allowing the additional request to the currently-processed request to be saved therein, may contribute to prevent the undesirable starvation or deadlock situation. The necessary size or capacity of the buffer depends on the number of clients, and, if any, estimates of the number of the respective requests. It is generally appreciated that a large number of clients needs a large buffer.

In the above circumstances, the developments of a novel system and a novel method for providing services to clients free from the above problems are desirable.

SUMMARY OF THE INVENTION

Accordingly, it is an object of the present invention to provide a novel system for providing services to clients free from the above problems.

It is a further object of the present invention to provide a novel system for allowing a server to provide respective services to plural clients accessible thereto in accordance with respective requests from the clients, without causing any undesirable starvation or deadlock situation, even when the server does not have a large buffer.

It is a still further object of the present invention to provide a novel method for providing services to clients free from the above problems.

The present invention provides a system for providing services, including: a plurality of clients for issuing request messages; and a server allowing access from the clients and processing the request messages in response to the respective request message in order to provide a response message to the one of the clients that issued the respective one of the request messages, wherein the server is adapted to recognize priority-related information of the request message for processing the request message, and the priority-related information includes: first information indicating whether the request message is first received or has been received in the past but rejected for processing; and second information indicating a receipt sequence of the request message.

Since the priority level depends on the first receiving time or the receipt sequence of the request message which have been rejected by the server due to its busy state or lower priority level than that of one or more other request messages, this may prevent any undesirable starvation or deadlock, without using a buffer in the server.

The above and other objects, features and advantages of the present invention will be apparent from the following description.

BRIEF DESCRIPTION OF THE DRAWINGS

Preferred embodiments according to the present invention will be described in detail with reference to the accompanying drawings.

FIG. 5 is a table illustrative of operations of the request-receiving unit included in the server of FIG. 3.

DETAILED DESCRIPTION OF THE PREFERRED EMBODIMENTS

Figure 1:
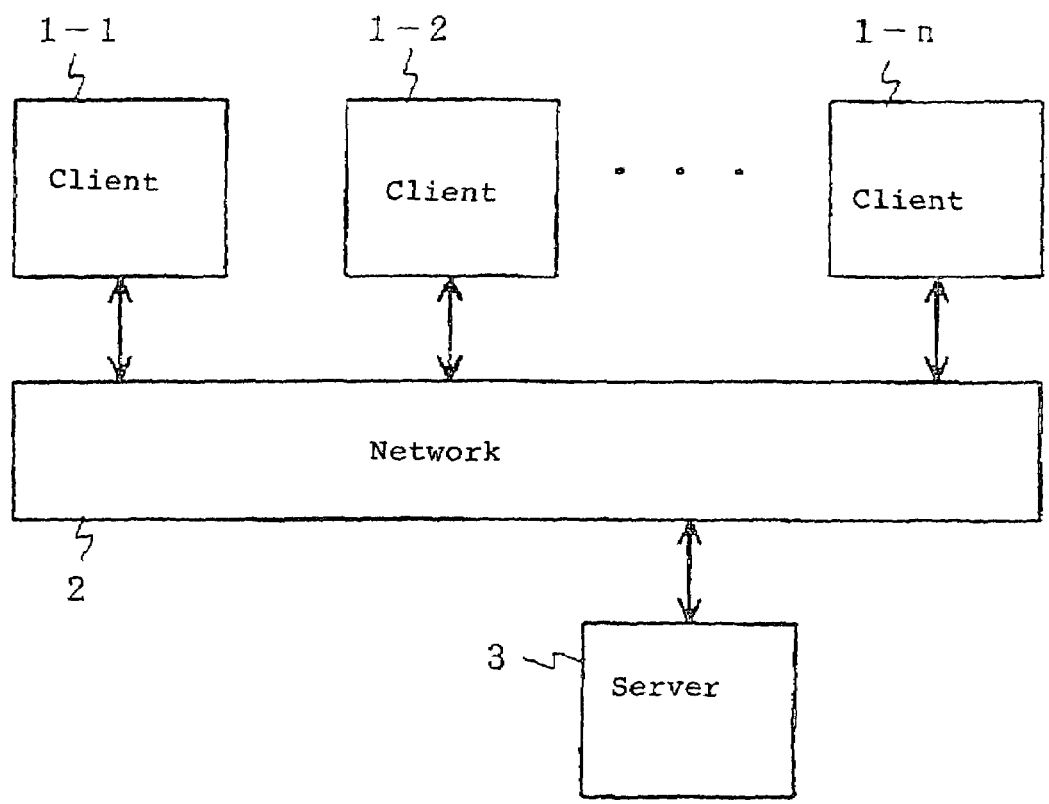
FIG. 1 is a block diagram illustrative of a novel service system in accordance with the first embodiment of the present invention.

A first aspect of the present invention is a system for providing services, including: a plurality of clients for issuing respective request messages; and one or more servers allowing access from the plurality of clients and processing the request messages to provide a response message to the one of the clients that issued the respective request message, wherein the server is adapted to recognize priority-related information of the request message for processing the request message, and the priority-related information includes: first information indicating whether the request message is first received or has been received in the past but rejected for processing; and second information indicating a receipt sequence of the request message.

Since the priority level depends on the first receiving time or the receipt sequence of the request message which have been rejected by the server due to its busy state or lower priority level than that of one or more other request messages, this may prevent any undesirable starvation or deadlock, without using a buffer in the server.

It is preferable that the server further includes: a process-deciding unit for recognizing the priority-related information to decide, whether the request message should promptly be processed or be rejected, with reference to the priority-related information; a processing unit for processing the request message; and a response unit for issuing the response message together with the second information and third information indicating whether the request message has been processed or rejected.

It is further preferable that each of the clients further includes: a request issuing unit for issuing the request message; and a response receiving unit for receiving the response message together with the second information and the third information and requesting the request issuing unit to re-issue the request message if the third information indicates that the request message has been rejected.

It is also preferable that the processing unit issues, to the process-deciding unit, fourth information indicating whether the processing unit is in an acceptable state which allows the processing unit to promptly process the request message or in an unacceptable state which inhibits the processing unit from promptly processing the request message, so that the process-deciding unit decides whether the request message should promptly be processed or be rejected, with reference to the fourth information in addition to the priority-related information.

It is further preferable that the process-deciding unit is adapted to hold therein a reservation number indicating a reservation order and a service number indicating a service order for the request message separately from the request message and the response message.

It is further more preferable that the first information comprises a retry flag, the second information comprises a retry identification number, and the third information comprises a response command.

It is moreover preferable that the retry identification number, the reservation number and the service number comprise the same number of bits.

It is further more preferable that the process-deciding unit sends the request message to the processing unit for allowing the processing unit to process the request message and requests the response unit to issue the response message together with the third information indicating that the request message has been processed, if the fourth information indicates that the processing unit is in the acceptable state, and the retry flag indicates that the request message is first received, and the reservation number is identical to the service number.

The process-deciding unit sets the response message with a retry identification number identical to the reservation number and requests the response unit to issue the response message together with the retry identification number and the third information indicating that the request message has been rejected as well as makes an increment to the reservation number, without sending the request message to the processing unit, if the fourth information indicates that the processing unit is in the acceptable state, and the retry flag indicates that the request message is first received, and the reservation number is not identical to the service number.

The process-deciding unit sets the response message with a retry identification number identical to the retry identification number attached to the request message and requests the response unit to issue the response message together with the retry identification number and the third information indicating that the request message has been rejected, without sending the request message to the processing unit, if the fourth information indicates that the processing unit is in the acceptable state, and the retry flag indicates that the request message has been received in the past but rejected for processing, and the retry identification number is not identical to the service number.

The process-deciding unit sends the request message to the processing unit for allowing the processing unit to process the request message and requests the response unit to issue the response message together with the third information indicating that the request message has been processed as well as makes an increment to the service number, if the fourth information indicates that the processing unit is in the acceptable state, and the retry flag indicates that the request message has been received in the past but rejected for processing, and the retry identification number is identical to the service number.

The process-deciding unit sets the response message with a retry identification number identical with the reservation number and requests the response unit to issue the response message together with the retry identification number and the third information indicating that the request message has been rejected as well as makes an increment to the reservation number, without sending the request message to the processing unit, if the fourth information indicates that the processing unit is in the unacceptable state, and the retry flag indicates that the request message is first received.

The process-deciding unit sets the response message with a retry identification number identical with the retry identification number attached to the request message and requests the response unit to issue the response message together with the retry identification number and the third information indicating that the request message has been rejected, without sending the request message to the processing unit, if the fourth information indicates that the processing unit is in the unacceptable state, and the retry flag indicates that the request message has been received in the past but rejected for processing.

It is also preferable that the reservation number and the service number comprise the same number of bits, and the retry identification number comprises a lower number of bits than the reservation number and the service number.

It is further preferable that the process-deciding unit sends the request message to the processing unit for allowing the processing unit to process the request message and requests the response unit to issue the response message together with the third information indicating that the request message has been processed, if the fourth information indicates that the processing unit is in the acceptable state, and the retry flag indicates that the request message is first received, and the reservation number is identical with to the service number.

The process-deciding unit sets the response message with a retry identification number identical with corresponding higher significant bits of the reservation number to the fewer bits of the retry identification number, and requests the response unit to issue the response message together with the retry identification number and the third information indicating that the request message has been rejected as well as makes an increment to the reservation number, without sending the request message to the processing unit, if the fourth information indicates that the processing unit is in the acceptable state, and the retry flag indicates that the request message is first received, and the reservation number is not identical with the service number.

The process-deciding unit sets the response message with a retry identification number identical with the retry identification number attached to the request message and requests the response unit to issue the response message together with the retry identification number and the third information indicating that the request message has been rejected, without sending the request message to the processing unit, if the fourth information indicates that the processing unit is in the acceptable state, and the retry flag indicates that the request message has been received in the past but rejected for processing, and the retry identification number is not identical with corresponding higher significant bits of the service number to the fewer number of bits of the retry identification number.

The process-deciding unit sends the request message to the processing unit for allowing the processing unit to process the request message and requests the response unit to issue the response message together with the third information indicating that the request message has been processed as well as makes an increment to the service number, if the fourth information indicates that the processing unit is in the acceptable state, and the retry flag indicates that the request message has been received in the past but rejected for processing, and the retry identification number is identical with corresponding higher significant bits of the service number.

The process-deciding unit sets the response message with a retry identification number identical with the corresponding higher significant bits of the reservation number and requests the response unit to issue the response message together with the retry identification number and the third information indicating that the request message has been rejected as well as makes an increment to the reservation number, without sending the request message to the processing unit, if the fourth information indicates that the processing unit is in the unacceptable state, and the retry flag indicates that the request message is first received.

The process-deciding unit sets the response message with a retry identification number identical with the retry identification number attached to the request message and requests the response unit to issue the response message together with the retry identification number and the third information indicating that the request message has been rejected, without sending the request message to the processing unit, if the fourth information indicates that the processing unit is in the unacceptable state, and the retry flag indicates that the request message has been received in the past but rejected for processing.

It is preferable that the at least master device comprises a plurality of servers.

It is further preferable that the client is adapted to select one of the plurality of servers for issuing the message request a first time to the selected one of the servers, and also to re-issue the message request to the selected one of the servers if the request message has been rejected by the selected server.

A second aspect of the present invention is a system for providing services, including: a plurality of clients for issuing request messages; and a server allowing access from the clients and processing the request messages to provide a response message to the client that issued the respective request message, wherein the server is adapted to give priority-related information to the response message in response to the request message if the server rejects the request message without processing the request message, and the priority-related information includes: first information indicating whether the request message is first received or has been received in the past but rejected for processing; and second information indicating a receipt sequence of the request message.

Since the priority level depends on the first receiving time or the receipt sequence of the request message which have been rejected by the server due to its busy state or lower priority level than that of one or more other request messages, this may prevent any undesirable starvation or deadlock, without using a buffer in the server.

It is preferable that the server further includes: a process-deciding unit for recognizing the priority-related information to decide, whether the request message should promptly be processed or be rejected, with reference to the priority-related information; a processing unit for processing the request message; and a response unit for issuing the response message together with the second information and third information indicating whether the request message has been processed or rejected.

It is preferable that each client further includes: a request issuing unit for issuing the request message; and a response receiving unit for receiving the response message together with the second information and the third information and requesting the request issuing unit to re-issue the request message if the third information indicates that the request message has been rejected.

It is also preferable that the processing unit issues, to the process-deciding unit, fourth information indicating whether the processing unit is in an acceptable state which allows the processing unit to promptly process the request message or in an unacceptable state which inhibits the processing unit from promptly processing the request message, so that the process-deciding unit decides whether the request message should promptly be processed or be rejected, with reference to the fourth information in addition to the priority-related information.

It is further preferable that the process-deciding unit is adapted to hold therein a reservation number indicating a reservation order and a service number indicating a service order for the request message separately from the request message and the response message.

It is further more preferable that the first information comprises a retry flag, the second information comprises a retry identification number, and the third information comprises a response command.

It is moreover preferable that the retry identification number, the reservation number and the service number comprise the same number of bits.

It is still more preferable that the process-deciding unit sends the request message to the processing unit for allowing the processing unit to process the request message and requests the response unit to issue the response message together with the third information indicating that the request message has been processed, if the fourth information indicates that the processing unit is in the acceptable state, and the retry flag indicates that the request message is first received, and the reservation number is identical with the service number.

The process-deciding unit sets the response message with a retry identification number identical with the reservation number and requests the response unit to issue the response message together with the retry identification number and the third information indicating that the request message has been rejected as well as makes an increment to the reservation number, without sending the request message to the processing unit, if the fourth information indicates that the processing unit is in the acceptable state, and the retry flag indicates that the request message is first received, and the reservation number is not identical with the service number.

The process-deciding unit sets the response message with a retry identification number identical with the retry identification number attached to the request message and requests the response unit to issue the response message together with the retry identification number and the third information indicating that the request message has been rejected, without sending the request message to the processing unit, if the fourth information indicates that the processing unit is in the acceptable state, and the retry flag indicates that the request message has been received in the past but rejected for processing, and the retry identification number is not identical with the service number.

The process-deciding unit sends the request message to the processing unit for allowing the processing unit to process the request message and requests the response unit to issue the response message together with the third information indicating that the request message has been processed as well as makes an increment to the service number, if the fourth information indicates that the processing unit is in the acceptable state, and the retry flag indicates that the request message has been received in the past but rejected for processing, and the retry identification number is identical with to the service number.

The process-deciding unit sets the response message with a retry identification number identical with the reservation number and requests the response unit to issue the response message together with the retry identification number and the third information indicating that the request message has been rejected as well as makes an increment to the reservation number, without sending the request message to the processing unit, if the fourth information indicates that the processing unit is in the unacceptable state, and the retry flag indicates that the request message is first received.

The process-deciding unit sets the response message with a retry identification number identical with the retry identification number attached to the request message and requests the response unit to issue the response message together with the retry identification number and the third information indicating that the request message has been rejected, without sending the request message to the processing unit, if the fourth information indicates that the processing unit is in the unacceptable state, and the retry flag indicates that the request message has been received in the past but rejected for processing.

It is also preferable that the reservation number and the service number comprise the same number of bits, and the retry identification number comprises fewer bits than the reservation number and the service number.

It is further preferable that the process-deciding unit sends the request message to the processing unit for allowing the processing unit to process the request message and requests the response unit to issue the response message together with the third information indicating that the request message has been processed, if the fourth information indicates that the processing unit is in the acceptable state, and the retry flag indicates that the request message is first received, and the reservation number is identical with to the service number.

The process-deciding unit sets the response message with a retry identification number identical with corresponding higher significant bits of the reservation number to the number of bits of the retry identification number, and requests the response unit to issue the response message together with the retry identification number and the third information indicating that the request message has been rejected as well as makes an increment to the reservation number, without sending the request message to the processing unit, if the fourth information indicates that the processing unit is in the acceptable state, and the retry flag indicates that the request message is first received, and the reservation number is not identical with the service number.

The process-deciding unit sets the response message with a retry identification number identical with the retry identification number attached to the request message and requests the response unit to issue the response message together with the retry identification number and the third information indicating that the request message has been rejected, without sending the request message to the processing unit, if the fourth information indicates that the processing unit is in the acceptable state, and the retry flag indicates that the request message has been received in the past but rejected for processing, and the retry identification number is not identical with corresponding higher significant bits of the service number to the less bit number of the retry identification number.

The process-deciding unit sends the request message to the processing unit for allowing the processing unit to process the request message and requests the response unit to issue the response message together with the third information indicating that the request message has been processed as well as makes an increment to the service number, if the fourth information indicates that the processing unit is in the acceptable state, and the retry flag indicates that the request message has been received in the past but rejected for processing, and the retry identification number is identical with corresponding higher significant bits of the service number.

The process-deciding unit sets the response message with a retry identification number identical with the corresponding higher significant bits of the reservation number and requests the response unit to issue the response message together with the retry identification number and the third information indicating that the request message has been rejected as well as makes an increment to the reservation number, without sending the request message to the processing unit, if the fourth information indicates that the processing unit is in the unacceptable state, and the retry flag indicates that the request message is first received.

The process-deciding unit sets the response message with a retry identification number identical with the retry identification number attached to the request message and requests the response unit to issue the response message together with the retry identification number and the third information indicating that the request message has been rejected, without sending the request message to the processing unit, if the fourth information indicates that the processing unit is in the unacceptable state, and the retry flag indicates that the request message has been received in the past but rejected for processing.

It is also preferable that the server comprises a plurality of servers.

It is further preferable that the client is adapted to select one of the servers for issuing the message request at a first time to the selected server, and also to re-issue the message request to the selected server if the request message has been rejected by the selected server.

A third aspect of the present invention is a method of controlling a system for providing services including: a plurality of clients for issuing request messages; and a server allowing access from the clients and processing the request messages to provide a response message to one of the clients that issued the request message, wherein the method includes: recognizing priority-related information of the request message for processing the request message, where the priority-related information includes: first information indicating whether the request message is first received or has been received in the past but rejected for processing; and second information indicating a receipt sequence of the request message.

Since the priority level depends on the first receiving time or the receipt sequence of the request message which have been rejected by the server due to its busy state or lower priority level than that of one or more other request messages, this may prevent any undesirable starvation or deadlock situation in which processing of the request message by the server is suspended, without using a buffer in the server.

It is preferable that the server decides whether the request message should promptly be processed or be rejected, with reference to the priority-related information; and the server processes the request message; and the server issues the response message together with the second information and third information indicating whether the request message has been processed or rejected.

It is preferable that each of the clients issues the request message; and each of the clients receives the response message together with the second information and the third information and re-issues the request message if the third information indicates that the request message has been rejected.

It is preferable that the server holds fourth information indicating whether the server is in an acceptable state which allows the server to promptly process the request message or in an unacceptable state which inhibits the server to promptly process the request message, so that the server decides, whether the request message should promptly be processed or be rejected, with reference to the fourth information in addition to the priority-related information.

It is preferable the server holds therein a reservation number indicating a reservation order and a service number indicating a service order for the request message separately from the request message and the response message.

It is preferable that the first information comprises a retry flag, the second information comprises a retry identification number, and the third information comprises a response command.

It is preferable that the retry identification number, the reservation number and the service number comprise the same number of bits.

It is preferable that the server processes the request message and issues the response message together with the third information indicating that the request message has been processed, if the fourth information indicates that the server is in the acceptable state, and the retry flag indicates that the request message is first received, and the reservation number is identical with the service number.

The server sets the response message with a retry identification number identical with the reservation number and requests the response unit and issues the response message together with the retry identification number and the third information indicating that the request message has been rejected as well as makes an increment to the reservation number, without processing the request message, if the fourth information indicates that the server is in the acceptable state, and the retry flag indicates that the request message is first received, and the reservation number is not identical with the service number.

The server sets the response message with a retry identification number identical with the retry identification number attached to the request message and issues the response message together with the retry identification number and the third information indicating that the request message has been rejected, without processing the request message, if the fourth information indicates that the server is in the acceptable state, and the retry flag indicates that the request message has been received in the past but rejected for processing, and the retry identification number is not identical with the service number.

The server processes the request message and issues the response message together with the third information indicating that the request message has been processed as well as makes an increment to the service number, if the fourth information indicates that the server is in the acceptable state, and the retry flag indicates that the request message has been received in the past but rejected for processing, and the retry identification number is identical with to the service number.

The server sets the response message with a retry identification number identical with the reservation number and issues the response message together with the retry identification number and the third information indicating that the request message has been rejected as well as makes an increment to the reservation number, without processing the request message, if the fourth information indicates that the server is in the unacceptable state, and the retry flag indicates that the request message is first received.

The server sets the response message with a retry identification number identical with the retry identification number attached to the request message and issues the response message together with the retry identification number and the third information indicating that the request message has been rejected, without processing the request message, if the fourth information indicates that the server is in the unacceptable state, and the retry flag indicates that the request message has been received in the past but rejected for processing.

It is preferable that the reservation number and the service number comprise the same number of bits, and the retry identification number comprises fewer bits than the reservation number and the service number.

It is preferable that the server processes the request message and issues the response message together with the third information indicating that the request message has been processed, if the fourth information indicates that the server is in the acceptable state, and the retry flag indicates that the request message is first received, and the reservation number is identical with to the service number.

The at least master device sets the response message with a retry identification number identical with corresponding higher significant bits of the reservation number to the number of bits of the retry identification number, and issues the response message together with the retry identification number and the third information indicating that the request message has been rejected as well as to make an increment to the reservation number, without processing the request message, if the fourth information indicates that the server is in the acceptable state, and the retry flag indicates that the request message is first received, and the reservation number is not identical with the service number.

The server sets the response message with a retry identification number identical with the retry identification number attached to the request message and issues the response message together with the retry identification number and the third information indicating that the request message has been rejected, without processing the request message, if the fourth information indicates that the server is in the acceptable state, and the retry flag indicates that the request message has been received in the past but rejected for processing, and the retry identification number is not identical with corresponding higher significant bits of the service number to the fewer bits of the retry identification number.

The server processes the request message and issues the response message together with the third information indicating that the request message has been processed as well as makes an increment to the service number, if the fourth information indicates that the server is in the acceptable state, and the retry flag indicates that the request message has been received in the past but rejected for processing, and the retry identification number is identical with corresponding higher significant bits of the service number.

The server sets the response message with a retry identification number identical with the corresponding higher significant bits of the reservation number and issues the response message together with the retry identification number and the third information indicating that the request message has been rejected as well as to make an increment to the reservation number, without processing the request message, if the fourth information indicates that the server is in the unacceptable state, and the retry flag indicates that the request message is first received.

The server sets the response message with a retry identification number identical with the retry identification number attached to the request message and issues the response message together with the retry identification number and the third information indicating that the request message has been rejected, without processing the request message, if the fourth information indicates that the server is in the unacceptable state, and the retry flag indicates that the request message has been received in the past but rejected for processing.

It is preferable that if the server comprises a plurality of servers, one of which is selected by the client for issuing the message request at a first time to the selected one of the servers, and also for re-issuing the message request to the selected server if the request message has been rejected by the selected server.

FIRST EMBODIMENT

A first embodiment according to the present invention will be described in detail with reference to the drawings. The service system includes at least a server and a plurality of clients, which are coupled to each other through any available coupling medium which allow bidirectional access between the server and the clients.

FIG. 1 is a block diagram illustrative of a novel service system in accordance with the first embodiment of the present invention. The service system includes a server 3 for providing services and a plurality of clients 1-1, 1-2, - - - 1-n, for requesting the server 3 to provide the services in response to the issued requests, wherein the clients 1-1, 1-2, - - - 1-n are coupled to the server 3 through a network 2. The clients 1-1, 1-2, - - - 1-n have a uniform or common internal configuration.

Figure 2:
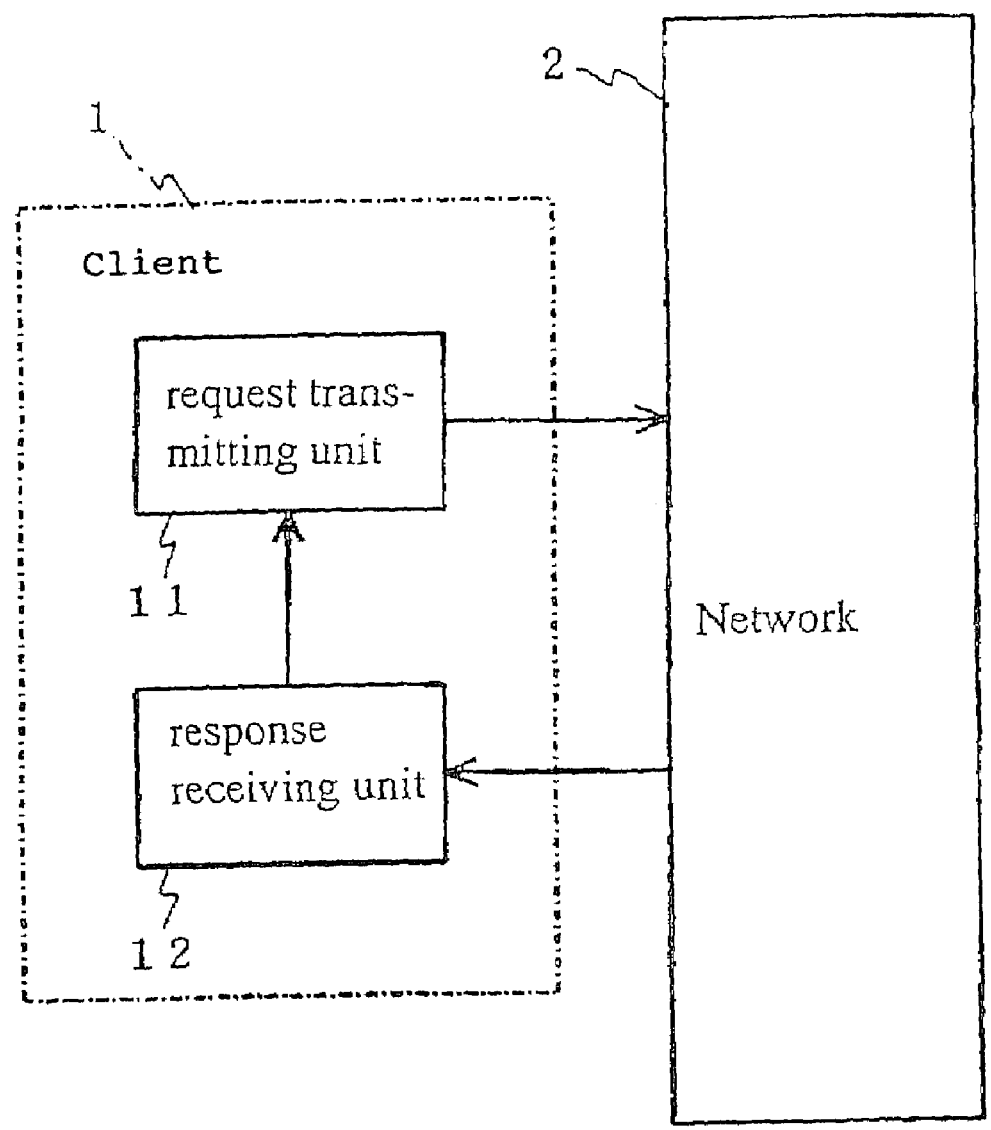
FIG. 2 is a block diagram illustrative of an internal configuration of each of the clients coupled to a network in the service system of FIG. 1.

FIG. 2 is a block diagram illustrative of an internal configuration of each of the clients coupled to the network in the service system of FIG. 1. The client 1 further includes a request transmitting unit 11, which transmits one or more request-messages through the network 2 to the server 3, and a response-receiving unit 12, which receives one or more response-messages from the server 3, wherein the response-message includes a service content and a response command value which indicates whether the server accepted or rejected the request. If the response command value indicates the request-acceptance by the server 3, then the response-receiving unit 12 sends a request-enable signal to the request transmitting unit 11, so that the request transmitting unit 11 is enabled to transmit a further request-massage. If the response command value indicates the request-rejection by the server 3, then the response-receiving unit 12 sends a request-retry signal to the request transmitting unit 11, so that the request transmitting unit 11 retry to transmit the once-rejected request-massage to the server 3. It is assumed that the maximum number of outstanding requests issued from the client 1-$i$ is "$k_i$".

Figure 3:
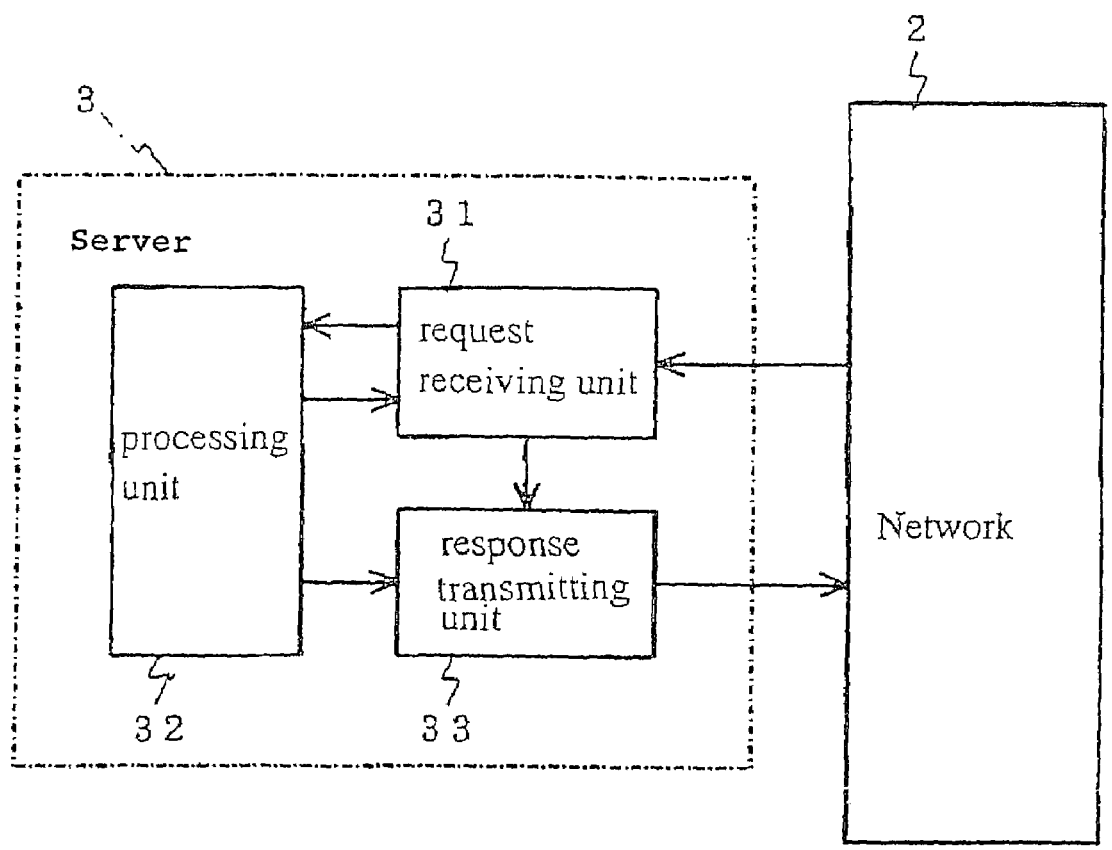
FIG. 3 is a block diagram illustrative of an internal configuration of the servers coupled to the network in the service system of FIG. 1.

FIG. 3 is a block diagram illustrative of an internal configuration of the server coupled to the network in the service system of FIG. 1. The server 3 further includes a processing unit 32 which processes the received requests, a request-receiving unit 31 and a response-transmitting unit 33. The processing unit 32 outputs a busy signal to the request-receiving unit 31.

The request-receiving unit 31 holds reservation numbers and a service number, each of which may be generated by using a ring-counter which is operable to count the number not less than "m" [m=$\Sigma$ $k_i$(i=0~n−1)]. In this embodiment, the request-receiving unit 31 includes a ring-counter of j-bits (m $\leq$ $2^j$), wherein an initial value is "0".

The network 2 allows transmissions of the request massages from the clients 1-1, 1-2, - - - 1-n to the server 3 as well as transmissions of the response massages from the server 3 to the clients 1-1, 1-2, - - - 1-n.

Figure 4A:
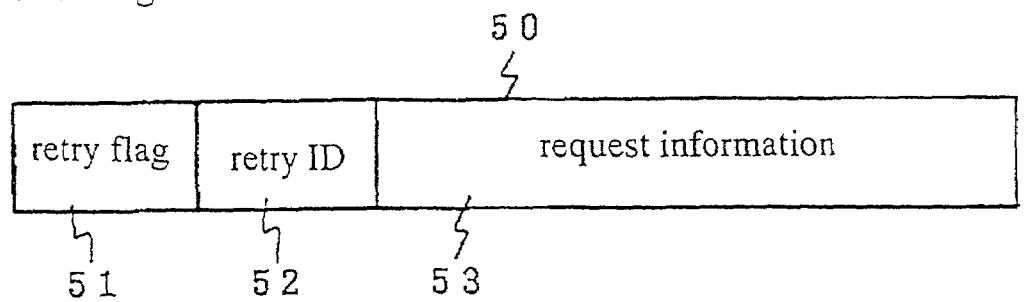
FIG. 4A is a diagram illustrative of a format of the request message in the system of FIG. 1.
Figure 4B:
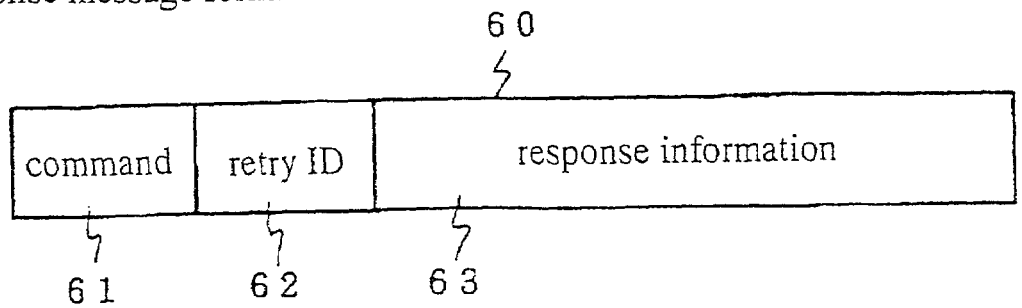
FIG. 4B is a diagram illustrative of a format of the response message in the system of FIG. 1.

FIG. 4A is a diagram illustrative of a format of the request message in the system of FIG. 1. FIG. 4B is a diagram illustrative of a format of the response message in the system of FIG. 1. A request message 50 issued from the clients 1-1, 1-2, - - - 1-n to the server 3 includes a retry flag 51, a retry identification 52 and a request information 53 which includes a request content. A response message 60 issued from the server 3 to the client 1 includes a response command 61, a retry identification 62 and a request information 63 which includes a request content.

Figure 6:
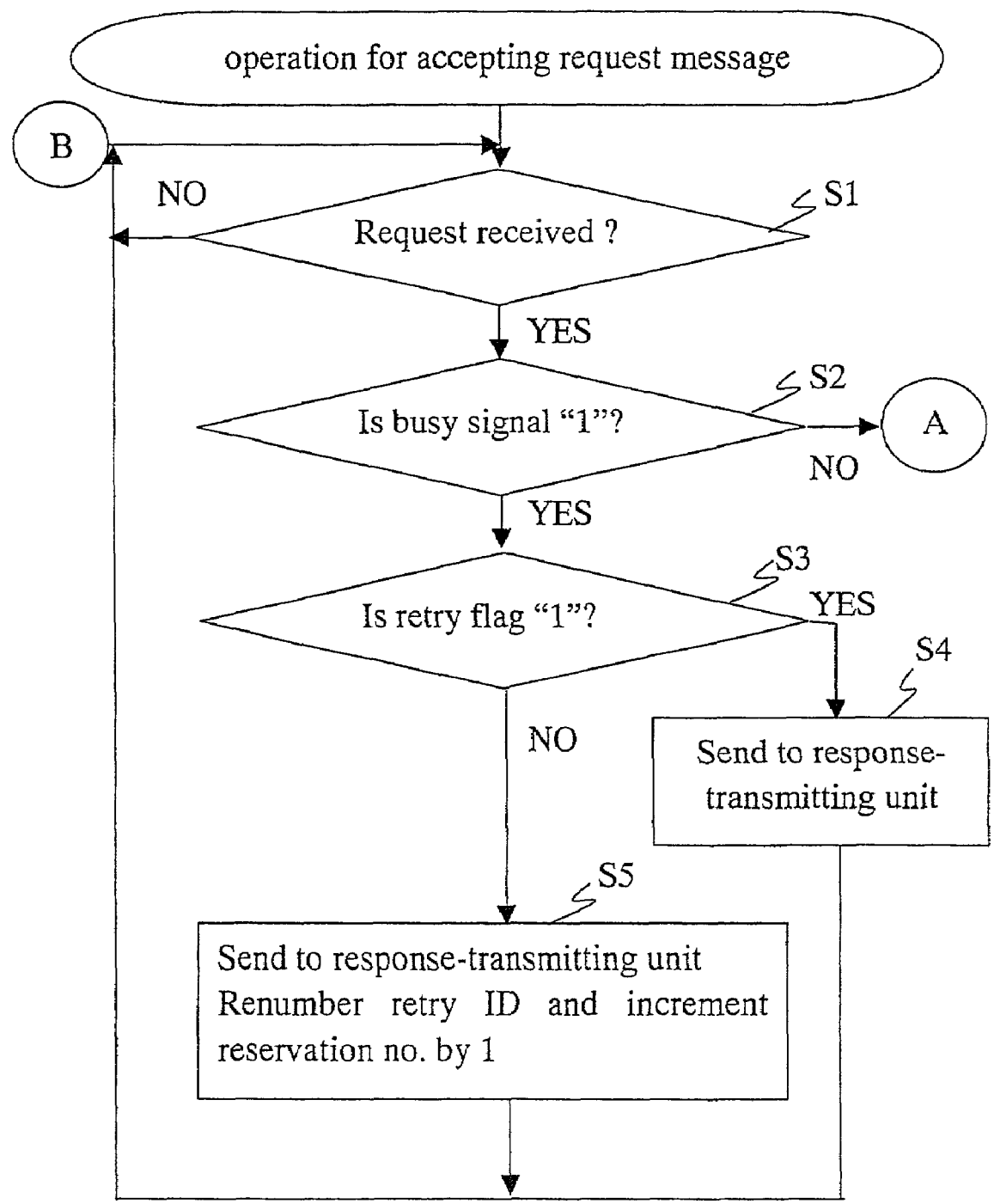
FIGS. 6 and 7 are associated flow charts illustrative of the operations of the request-receiving unit included in the server of FIG. 3.
Figure 7:
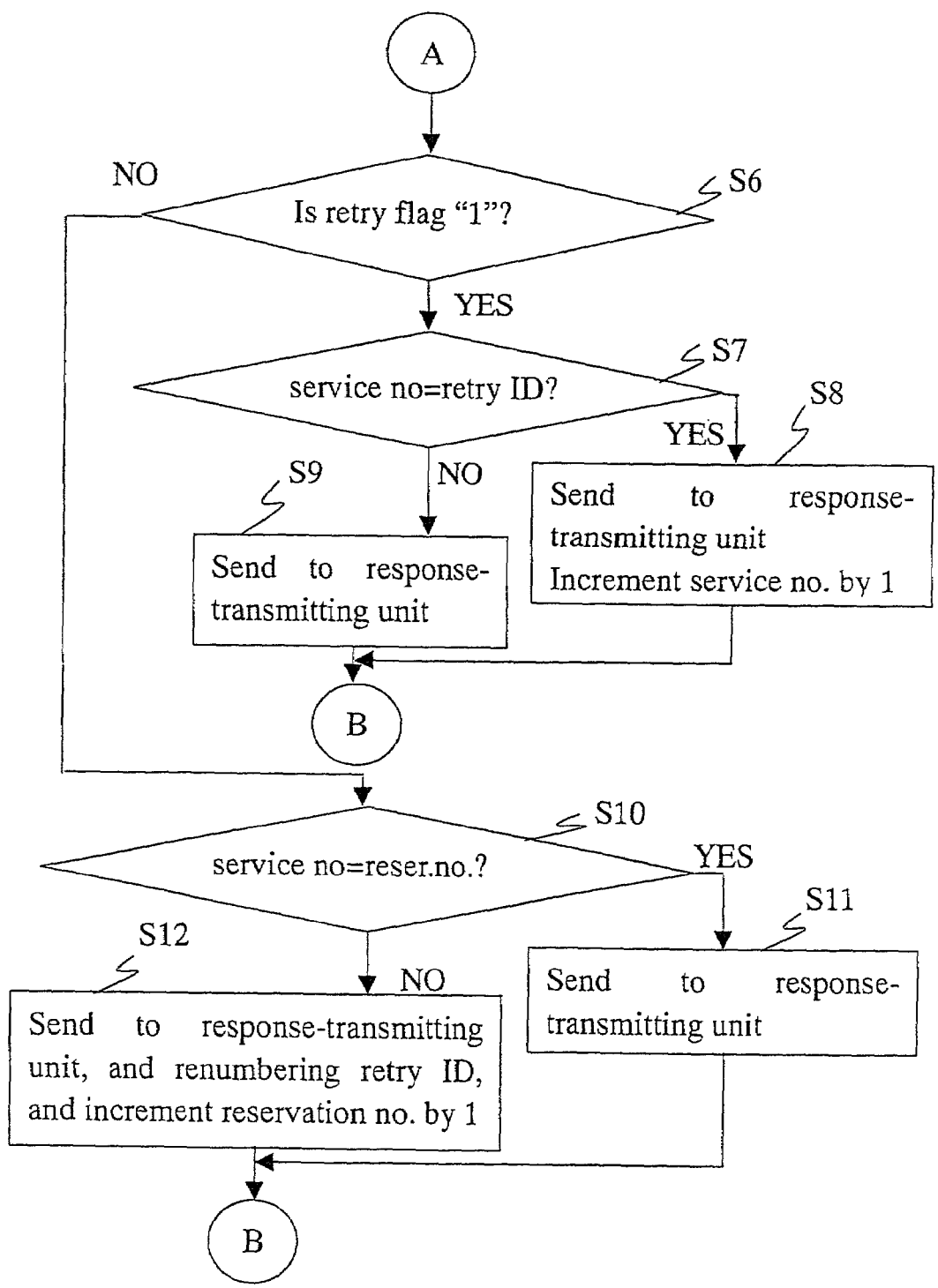
Figure 8:
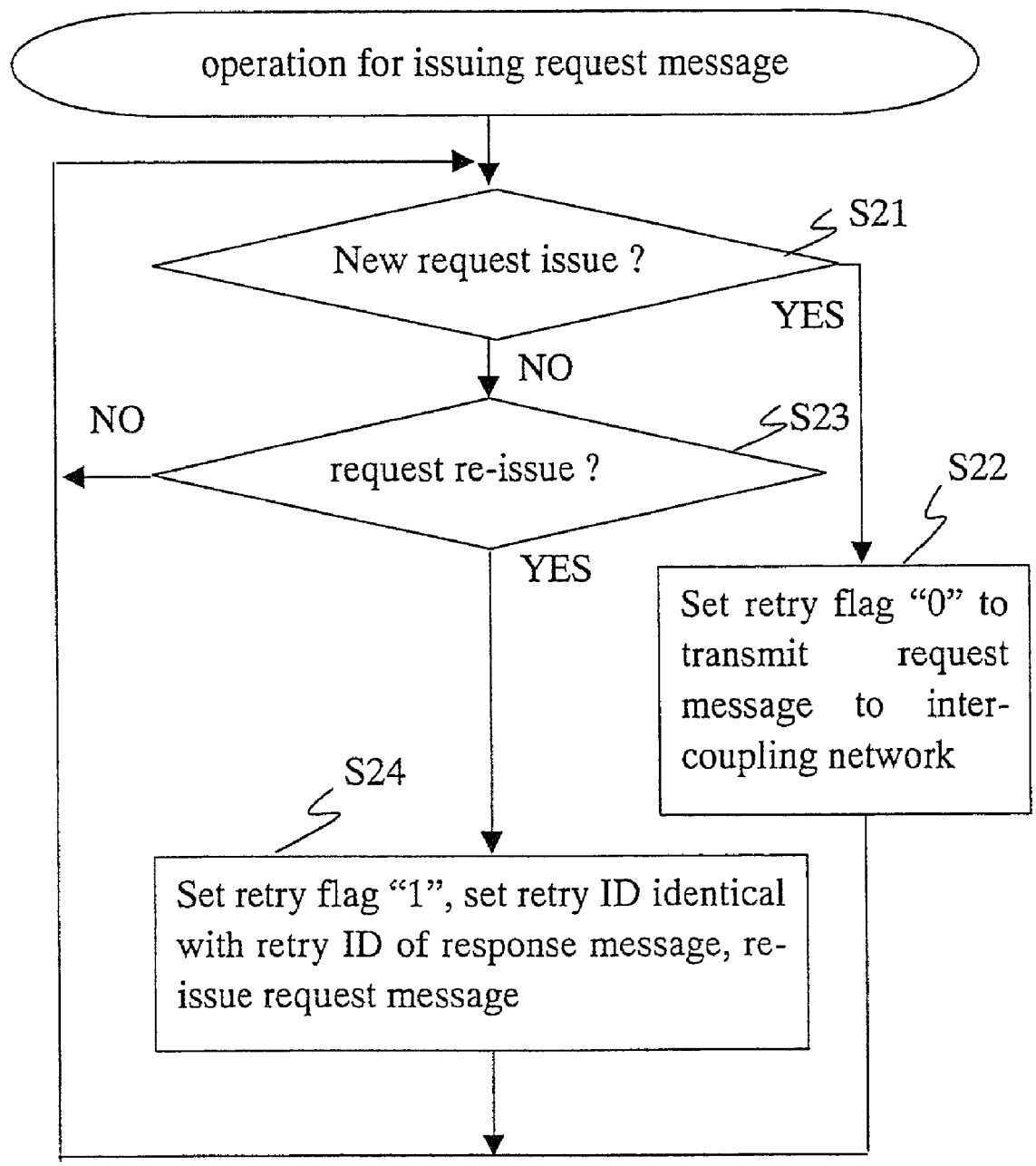
FIG. 8 is a flow chart illustrative of the request-issuing operations of the request transmitting unit included in the client of FIG. 2.
Figure 9:
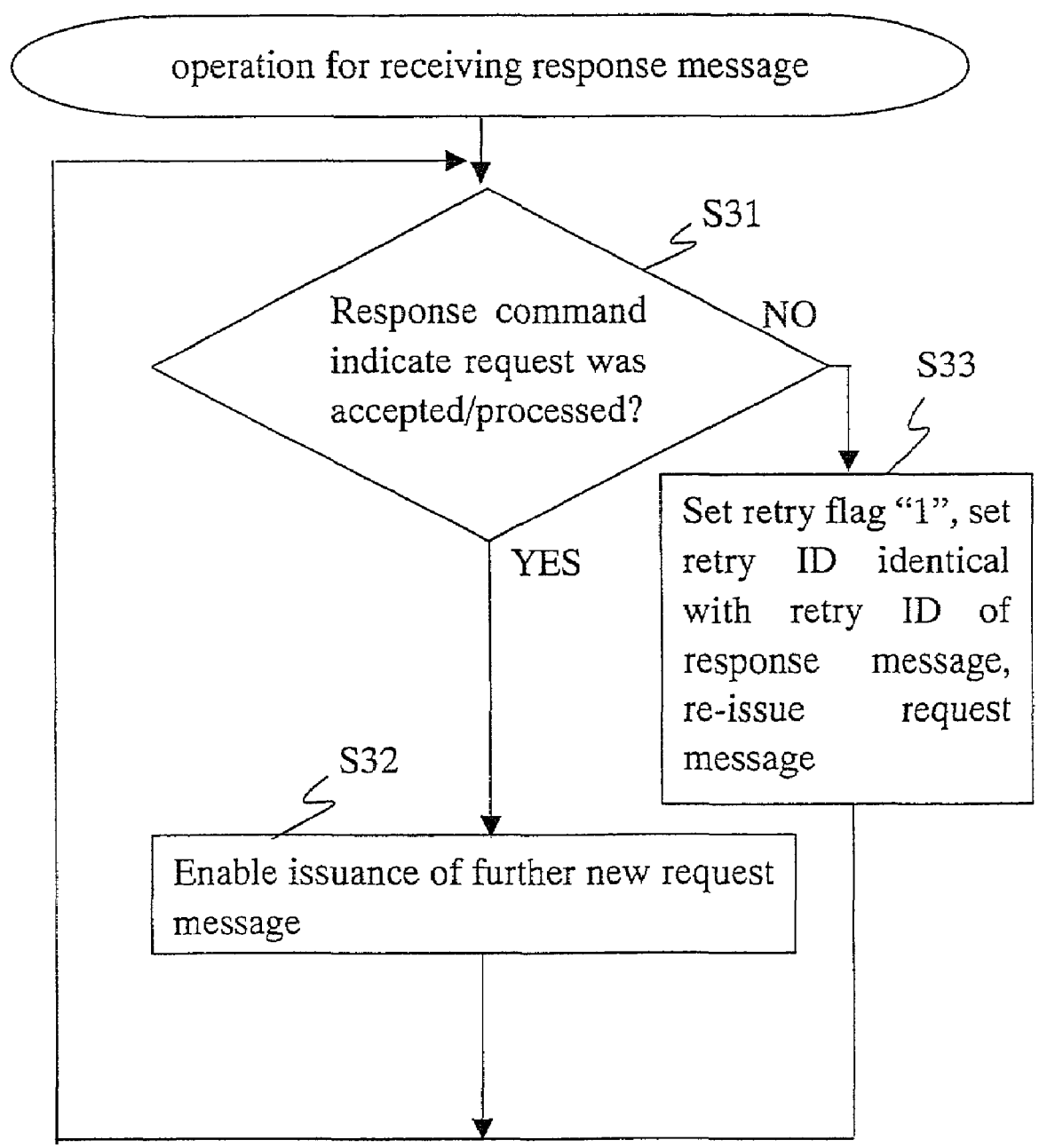
FIG. 9 is a flow chart illustrative of the response-receiving operations of the response-receiving unit included in the client of FIG. 2.

FIG. 5 is a table illustrative of operations of the request-receiving unit 31 included in the server of FIG. 3. FIGS. 6 and 7 are associated flow charts illustrative of the operations of the request-receiving unit included in the server of FIG. 3. FIG. 8 is a flow chart illustrative of the request-issuing operations of the request transmitting unit included in the client of FIG. 2. FIG. 9 is a flow chart illustrative of the response-receiving operations of the response-receiving unit included in the client of FIG. 2. The overall operations of the system of this embodiment will hereinafter be described with reference to FIGS. 1–9.

In the step S21 of FIG. 8, the client 1-1 issues a new request. In the step S22 of FIG. 8, the request transmitting unit 11 sets the retry flag 51 at "0" to generate a request message 50 and transmits the request message 50 through the network 2 to the server 3. The issued request message 50 will hereinafter be referred as "request [Ra]".

In the steps S1 and S2 of FIG. 6, it is assumed that at the time when the request-receiving unit 31 of the server 3 receives the request [Ra], the busy signal, the service number and the reservation number take initial value "0" respectively.

In the step S2 of FIG. 6 and the steps S6 and S7 of FIG. 7, the busy signal is "0", the retry flag is "0" and the service number and the reservation number take the same value "0". In the step S11 of FIG. 7, the request [Ra] is transmitted from the request-receiving unit 31 to the processing unit 32. The processing unit 32 receives the request [Ra] and enters into the processing state, during which the busy signal is maintained at "1", which indicates the processing unit 32 of the server 3 is busy and placed in the currently-processing state which does not accept further requests.

After the processing unit 32 completes processing the request [Ra], then the processing unit 32 sends the response-transmitting unit 33 a request for transmitting the request-acceptance. After the response-transmitting unit 33 received the request for transmitting the request-acceptance, then the processing unit 32 sets the busy signal at "0" which indicates the processing unit 32 of the server 3 is prepared to accept further requests.

Upon receipt of the request for transmitting the request-acceptance, the response-transmitting unit 33 generates a response message 60 including the response command 61 of "0" which indicates that the request [Ra] has been processed and transmits the response message 60 through the network 2 to the client 1-1 for giving the client 1-1 a notice to the effect that the request [Ra] has been processed by the server 3.

In the step S31 of FIG. 9, the response-receiving unit 12 of the client 1-1 receives the response message 60 including the response command 61 of "0". In the step S32 of FIG. 9, the response-receiving unit 12 sends a request-enable signal to the request transmitting unit 11 for enabling the request transmitting unit 11 to issue any further request.

During the processing of the request [Ra] by the processing unit 32, the busy signal is maintained at "1" which indicates that the processing unit 32 is busy and placed in the currently-processing state which does not accept further requests. It is assumed that during the busy state "1" of the busy signal, the client 1-2 issues another request message 50 which will hereinafter be referred to as "request [Rb], and wherein the retry flag is set at "0". In the step S1 of FIG. 6, the request-receiving unit 31 receives the request [Rb], whilst in the steps S2 and S3 of FIG. 6, the busy signal is "1" and the retry flag is "0". The request-receiving unit 31 sends the response-transmitting unit 33 a request for issuing the notice of rejection to the request [Rb], wherein the retry identification 62 becomes "0" identical with the current reservation number "0", and further the current reservation number "0" is incremented to "1" in the step S5 of FIG. 6.

The response-transmitting unit 33 receives the request for issuing the notice of rejection to the request [Rb], and transmits the response message 60 including the retry identification 62 at "0" and the response command 61 at "1" through the network 2 to the client 1-2 which had issued the rejected request [Rb].

In the step S31 of FIG. 9, the response-receiving unit 12 of the client 1-2 receives the response message 60 including the retry identification 62 at "0" and the response command 61 at "1" which indicates that the request [Rb] was rejected by the server 3. In the step S33 of FIG. 9, the response-receiving unit 12 sends the request transmitting unit 11 a request for re-transmitting the request [Rb]. The request transmitting unit 11 receives the request for re-transmitting the request [Rb] from the response-receiving unit 12. In the steps S23 and S24 of FIG. 8, the request transmitting unit 11 sets the retry flag 51 at "1" and the retry identification 52 at "0" in accordance with "0" of the retry identification 62 included in the received response message 60. The request transmitting unit 11 re-issues the request [Rb] through the network 2 to the server 3.

After the processing of the prior request [Ra] by the processing unit 32 of the server 3 has been completed, then the processing unit 32 sets the busy signal at "0". It is assumed that the request-receiving unit 31 holds the reservation number "1" and the service number "0", and further the client 1-3 issues still another request message 50 which will hereinafter be referred to as "request [Rc]", wherein the request [Rc] includes the retry flag "0". The request [Rc] is also transmitted through the network 2 to the server 3.

In the step S1 of FIG. 6, the request-receiving unit 31 of the server 3 receives the request [Rc]. In the step S2 of FIG. 6 and the steps S6 and S10 of FIG. 7, the busy signal is "0", the retry flag is "0" and the service number and the reservation number take different values "0" and "1" respectively. In the step S12 of FIG. 7, the request-receiving unit 31 sends the response-transmitting unit 33 a request for issuing the notice of rejection to the request [Rc], wherein the retry identification 62 becomes identical with the current reservation number "1", and further the current reservation number "1" is incremented to "2" in the step S12 of FIG. 7.

The response-transmitting unit 33 receives the request for issuing the notice of rejection to the request [Rc], and transmits the response message 60 including the retry identification 62 at "1" and the response command 61 at "1" through the network 2 to the client 1-3 which had issued the rejected request [Rc].

In the step S31 of FIG. 9, the response-receiving unit 12 of the client 1-3 receives the response message 60 including the retry identification 62 at "1" and the response command 61 at "1" which indicates that the request [Rc] was rejected by the server 3. In the step S33 of FIG. 9, the response-receiving unit 12 sends the request transmitting unit 11 a request for re-transmitting the request [Rc]. The request transmitting unit 11 receives the request for re-transmitting the request [Rc] from the response-receiving unit 12. In the steps S23 and S24 of FIG. 8, the request transmitting unit 11 sets the retry flag 51 at "1" and the retry identification 52 at "1" in accordance with "1" of the retry identification 62 included in the received response message 60. The request transmitting unit 11 re-issues the request [Rc] through the network 2 to the server 3.

In the step S1 of FIG. 6, the request-receiving unit 31 of the master device 3 receives the request [Rc] re-issued. In the step S2 of FIG. 6 and the steps S6 and S7 of FIG. 7, the busy signal is "0", the retry flag 51 is "1" and the service number and the retry identification 52 take different values "0" and "1" respectively. In the step S9 of FIG. 7, the processing unit 32 sends the response-transmitting unit 33 a request for issuing the notice of rejection to the request [Rc].

The response-transmitting unit 33 receives the request for issuing the notice of rejection to the request [Rc], and transmits the response message 60 including the retry identification 62 at "1" and the response command 61 at "1" through the network 2 to the client 1-3 which had issued the rejected request [Rc].

In the step S1 of FIG. 6, the request-receiving unit 31 of the master device 3 receives the request [Rb] re-issued from the slave device 1-2. In the step S2 of FIG. 6 and the steps S6 and S7 of FIG. 7, the busy signal is "0", the retry flag is "1" and the service number and the retry identification 52 take the same value "0". In the step S8 of FIG. 7, the request [Rb] is transmitted from the request-receiving unit 31 to the processing unit 32 and the current service number "0" is incremented to "1". The processing unit 32 receives the request [Rb] and enters into the processing state, during which the busy signal is maintained at "1".

After the processing unit 32 completes the processing of the request [Rb], then the processing unit 32 sends the response-transmitting unit 33 a request for transmitting the request-acceptance. After the response-transmitting unit 33 received the request for transmitting the request-acceptance, then the processing unit 32 sets the busy signal at "0".

Upon receipt of the request for transmitting the request-acceptance, the response-transmitting unit 33 generates a response message 60 including the response command 61 of "0" which indicates that the request [Rb] has been processed and transmits the response message 60 through the network 2 to the client 1-2 for giving the client 1-2 a notice to the effect that the request [Rb] has been processed by the server 3.

In the step S31 of FIG. 9, the response-receiving unit 12 of the client 1-2 receives the response message 60 including the response command 61 of "0". In the step S32 of FIG. 9, the response-receiving unit 12 sends a request-enable signal to the request transmitting unit 11 for enabling the request transmitting unit 11 to issue or transmit any further request.

During the processings to the request [Rb] by the processing unit 32, the busy signal is maintained at "1". It is assumed that during the busy state "1" of the busy signal, the client 1-3 re-issues the request [Rc]. In the step S1 of FIG. 6, the request-receiving unit 31 receives the request [Rc], whilst in the steps S2 and S3 of FIG. 6, the busy signal is "1" and the retry flag is "1". In the step S4 of FIG. 6, the processing unit 32 sends the response-transmitting unit 33 a request for issuing the notice of rejection to the request [Rc], wherein the retry identification 62 becomes "1" identical with "1" of the retry identification 52 included in the request message 50.

In the step S31 of FIG. 9, the response-receiving unit 12 of the client 1-3 receives the response message 60 including the retry identification 62 at "1" and the response command 61 at "1" which indicates that the request [Rb] was rejected by the server 3. In the step S33 of FIG. 9, the response-receiving unit 12 sends the request transmitting unit 11 a request for re-transmitting the request [Rc]. The request transmitting unit 11 receives the request for re-transmitting the request [Rc] from the response-receiving unit 12. In the steps S23 and S24 of FIG. 8, the request transmitting unit 11 sets the retry flag 51 at "1" and the retry identification 52 at "1" in accordance with "1" of the retry identification 62 included in the received response message 60. The request transmitting unit 11 re-transmits or re-issues the request [Rc] through the network 2 to the server 3.

After the processing of the prior request [Rb] by the processing unit 32 of the server 3 has been completed, then the processing unit 32 sets the busy signal at "0". It is assumed that the request-receiving unit 31 holds the reservation number "2" and the service number "1", and further the client 1-3 re-issues the once rejected request [Rc], wherein the request [Rc] includes the retry flag "1" and the retry identification "1". The request [Rc] is also transmitted through the network 2 to the server 3.

In the step S1 of FIG. 6, the request-receiving unit 31 of the server 3 receives the request [Rc] re-issued from the client 1-3. In the step S2 of FIG. 6 and the steps S6 and S7 of FIG. 7, the busy signal is "0", the retry flag is "1" and the service number and the retry identification 52 take the same value "1". In the step S8 of FIG. 7, the request [Rc] is transmitted from the request-receiving unit 31 to the processing unit 32 and the current service number "1" is incremented to "2". The processing unit 32 receives the request [Rc] and enters into the processing state, during which the busy signal is maintained at "1". The current service number "1" is incremented to "2" in the step S8 of FIG. 7.

Upon receipt of the request for transmitting the request-acceptance, the response-transmitting unit 33 generates a response message 60 including the response command 61 of "0" which indicates that the request [Rc] has been processed and transmits the response message 60 through the network 2 to the client 1-3 for giving the client 1-3 a notice to the effect that the request [Rc] has been processed by the server 3.

In the step S31 of FIG. 9, the response-receiving unit 12 of the client 1-3 receives the response message 60 including the response command 61 of "0". In the step S32 of FIG. 9, the response-receiving unit 12 sends a request-enable signal to the request transmitting unit 11 for enabling the request transmitting unit 11 to issue or transmit any further request.

Consequently, the server is adapted to give priorities to respective requests in the sequence of the first receiving times from the clients, wherein the given priorities of the respective requests correspond to the sequence of the first receiving times thereof, so that the server determines the sequences of processings based on the respectively given priorities for allowing the server to decide to process the highest priority one of the requests, whereby the server rejects any lower priority given requests or a no-priority-given request which is first received, regardless of the busy or non-busy state, until the server receives the highest priority request in the non-busy time and completes the proceeding to the highest priority request. Since the priority level depends on the first receiving time or the receipt sequence of the request message which have been rejected by the server due to its busy state or lower priority level than that of one or more other request messages, this may prevent any undesirable starvation or deadlock situation, without using a buffer in the server.

Modification:

The above described novel feature of the system in accordance with the first embodiment of the present invention may optionally be applied to another system which includes a plurality of servers and a plurality of clients which are also accessible to the plurality of servers through any available network.

Figure 10:
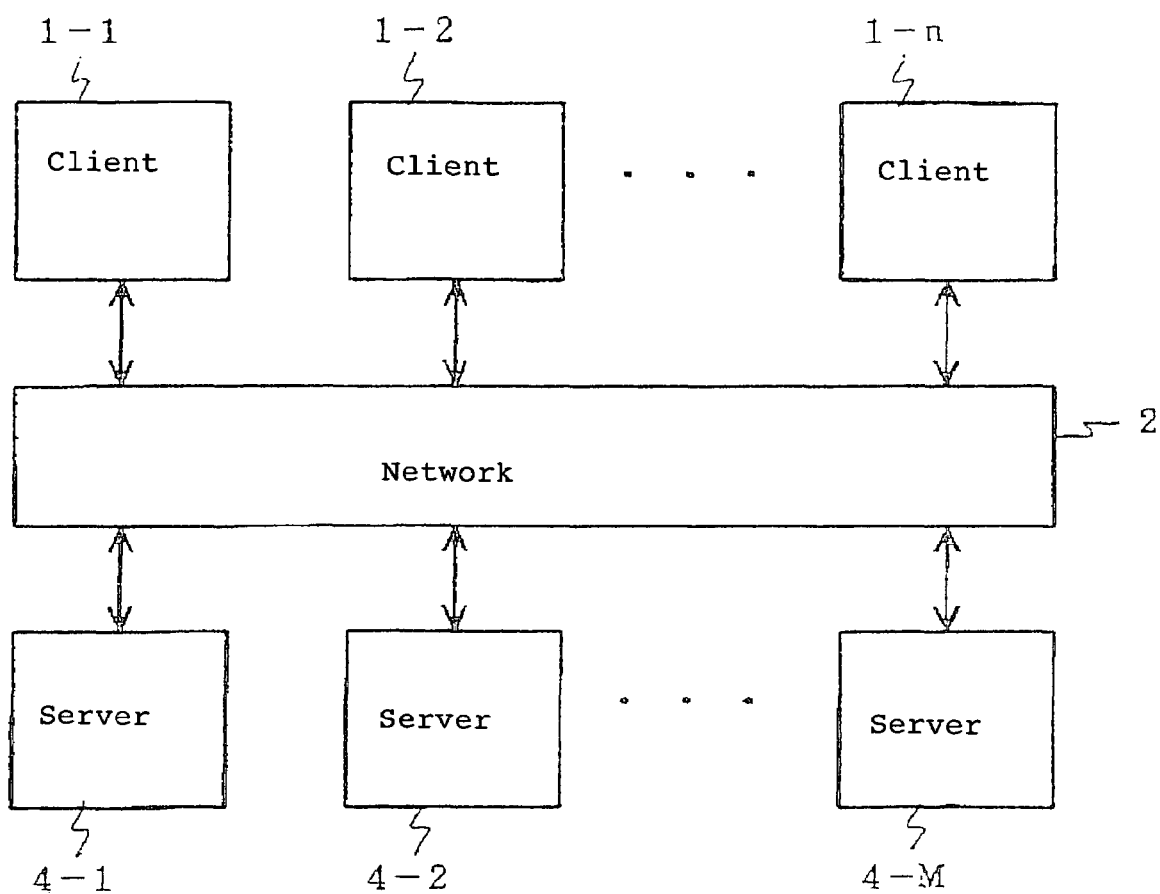
FIG. 10 is a block diagram illustrative of a novel service system in accordance with the modified embodiment of the present invention.

FIG. 10 is a block diagram illustrative of a novel service system in accordance with the modified embodiment of the present invention. The service system includes a plurality of servers 4-1, 4-2, - - - 4-M for providing services and a plurality of clients 1-1, 1-2, - - - 1-$n$ for requesting the servers 4-1, 4-2, - - - 4-M to provide the services in response to the issued requests, wherein the clients 1-1, 1-2, - - - 1-$n$ are coupled to the servers 4-1, 4-2, - - - 4-M through the network 2. The clients 1-1, 1-2, - - - 1-$n$ have a uniform or common internal configuration as described above and shown in FIG. 2. The servers 4-1, 4-2, - - - 4-M have a uniform or common internal configuration as described above and shown in FIG. 3. The following descriptions will focus on the difference of this modified embodiment from the above first embodiment.

Each client 1 selects one of the servers 4-1, 4-2, - - - 4-M for transmitting the request thereto. If the request is rejected by the selected server 4-i, then the client 1 re-transmits the rejected request to the selected server 4-i which requested the request.

It is assumed that the each server 4-i has a respective maximum request number "$m_i$" which indicates the maximum number of the requests acceptable to the server 4-i. The request-receiving unit 31 of the server 4-i holds reservation numbers and a service number, each of which may be generated by using a counter which is operable to count the number not less than "$m_i$".

The retry identification 52 included in the request message 50 comprises the necessary bit number which is capable of representing the maximum value of the respective maximum request numbers "$m_1$", $m_2$" - - - "$m_i$" - - - "$m_M$" of the servers 4-1, 4-2, - - - 4-i, - - - 4-M. The retry identification 62 included in the response message 60 also comprises the necessary number of bits which is capable of representing the maximum value of the respective maximum request numbers "$m_1$", "$m_2$" - - - "$m_i$" - - - "$m_M$" of the servers 4-1, 4-2, - - - 4-i, - - - 4-M.

In the modified embodiment, the retry identifications 52 and 62 of the request and response messages 50 and 60 respectively may be represented in g-bits (g<j). The request-receiving unit 31 of the clients 1-1, 1-2, - - - 1-n of the modified embodiment needs the ring-counter of 1-bits (m+2 ($^1$-g)$\leq 2^1$) for holding the reservation number and the service number. In this case, the operations are different from what was described in the first embodiment in connection with the operations of the request-receiving unit 31 and the response-transmitting unit 33. For the operation of the request-receiving unit 31, the service number is the 1-bits, whilst the retry identification 52 of the request message 50 is the g-bits, for which reason the higher significant g-bits in the 1-bits of the service number are compared to the retry identification 52 of the g-bits. For the operations of the response-transmitting unit 33, if the response-transmitting unit 33 sends the notice that the request message 50 including the retry flag 51 at "0" was rejected, then the response-transmitting unit 33 sets the retry identification 62 of the response message 60 on the basis of the reservation number. In the first embodiment, the retry identification 62 of the response message 60 is set identical with the value of the reservation number. In the modified embodiment, the retry identification 62 of the response message 60 is set identical with the higher significant g-bits of the reservation number.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A system for providing services, comprising:

clients for issuing request messages, each of the request messages including a retry flag indicating whether the respective one of the request messages has been rejected and a retry identification; and a server receiving the request messages and processing or rejecting the request messages, said server including a reservation number, a service number, and means for checking whether said server is busy, wherein said server processes a respective one of the request messages if said server is not busy, said retry flag indicates that the respective one of the request messages has not been rejected, and said reservation number is identical to said service number, wherein said server processes a respective one of the request messages and increments said service number if said server is not busy, said retry flag indicates that the respective one of the request messages has been rejected, and said retry identification is identical to said service number, wherein said server rejects a respective one of the request messages and assigns the respective one of the request messages the retry identification that is identical to said reservation number and increments said reservation number if (a) said server is not busy, said retry flag indicates that the respective request message has not been rejected and said reservation number is different from said service number, or (b) said server is busy and said retry flag indicates that the respective request message has not been rejected, and wherein said server rejects a respective one of the request messages if (a) said server is not busy, said retry flag indicates that the respective request message has been rejected and said retry identification is different from said service number, or (b) said server is busy and said retry flag indicates that the respective request message has been rejected.

2. The system of claim 1, wherein said reservation number and said service number are each represented by "n" bits, wherein said retry identification is represented by "m" bits, where "m" is equal to or less than "n", and wherein said server compares a first "m" bits of said service number and the "m" bits of said retry identification, and assigns the respective request message an "m" bits retry identification that is identical to a first "m" bits of said reservation number.

3. A method for providing services, comprising the steps of:

issuing request messages from clients, each of the request messages including a retry flag indicating whether the respective one of the request messages has been rejected and a retry identification;

receiving the request messages at a server that processes or rejects the request messages, the server including a reservation number, a service number, and means for checking whether the server is busy;

processing a respective one of the request messages at the server if the server is not busy, the retry flag indicates that the respective one of the request messages has not been rejected, and the reservation number is identical to the service number;

processing a respective one of the request messages at the server and incrementing the service number if the server is not busy, the retry flag indicates that the respective one of the request messages has been rejected, and the retry identification is identical to the service number;

rejecting a respective one of the request messages at the server and assigning the respective one of the request messages the retry identification that is identical to the reservation number and incrementing the reservation number if (a) the server is not busy, the retry flag indicates that the respective request message has not been rejected and the reservation number is different from the service number, or (b) the server is busy and the retry flag indicates that the respective request message has not been rejected; and rejecting a respective one of the request messages at the server if (a) the server is not busy, the retry flag indicates that the respective request message has been rejected and the retry identification is different from the service number, or (b) the server is busy and the retry flag indicates that the respective request message has been rejected.

4. The method of claim 3, wherein the reservation number and the service number are each represented by "n" bits, wherein the retry identification is represented by "m" bits, where "m" is equal to or less than "n", and further comprising the step wherein the server compares a first "m" bits of the service number and the "m" bits of the retry identification, and assigns the respective request message an "m" bits retry identification that is identical to a first "m" bits of the reservation number.

* * * * *